United States Patent [19]

Tsai et al.

[11] Patent Number: 5,403,894
[45] Date of Patent: Apr. 4, 1995

[54] A REDISPERSIBLE CORE-SHELL POLYMER POWDER

[75] Inventors: Min-Chi Tsai, Ambler; George A. Papsin, Jr., North Wales; Shang-Jaw Chiou, Lower Gwynedd, all of Pa.

[73] Assignee: Rohm and Haas Company, Philadelphia, Pa.

[21] Appl. No.: 728,398

[22] Filed: Jul. 11, 1991

[51] Int. Cl.$^6$ .................. C08F 265/02; C08F 265/04; C08F 265/06; C08F 265/10

[52] U.S. Cl. ..................... 525/285; 525/296; 525/301; 525/302; 525/303; 525/304; 525/309; 525/902; 524/8; 106/713

[58] Field of Search ............... 525/285, 296, 301, 302, 525/303, 304, 309, 378, 369, 902; 524/8; 106/713

[56] References Cited

U.S. PATENT DOCUMENTS 4,468,498  8/1984  Kowalski et al. ................... 525/301
4,876,313  10/1989  Lorah ................... 525/281

FOREIGN PATENT DOCUMENTS 0338486  10/1989  European Pat. Off. .

Primary Examiner—Vasu S. Jagannathan
Attorney, Agent, or Firm—Marvin J. Powell

[57] ABSTRACT

Redispersible polymer powders made by core-shell polymers having an alkali-soluble emulsion polymer shell and an aqueous-insoluble emulsion polymer core wherein the core and the shell polymers are chemically grafted by utilizing a polyfunctional compound. The core-shell polymers are produced by a two-stage sequential emulsion polymerization process in which an alkali-insoluble emulsion polymer core is polymerized in the presence of an alkali-solubilized emulsion polymer. When the core-shell polymer powders of this invention are employed as a cement modifier, improvements in the powder physical properties and cement mortar properties are realized.

14 Claims, No Drawings

A REDISPERSIBLE CORE-SHELL POLYMER POWDER

FIELD OF THE INVENTION

This invention relates to a process for the preparation of a core-shell polymer powder that is produced by a two-stage aqueous emulsion sequential process and that is particularly useful as an acrylic modifier for cement. The core-shell polymer powders of this invention have excellent physical properties such as redispersability and, when used as a cement modifier, provide excellent properties in thin section application, provide adhesion to a variety of substrates and provide tensile, flexural and compressive strength.

BACKGROUND OF THE INVENTION

The use of redispersible polymer powders as cement modifiers is known. However, in order for the polymer powder to be effective, the following critical requirements have to be met: it should be capable of flowing freely, it should have a long storage life and it should be redispersible in water. Additionally, the polymer powders should be suitable in shearbond adhesion applications and should have superior properties when the powder is used to modify thin sections of cement. These properties are fulfilled only partially by powders which are prepared utilizing prior art blends, mixtures and core-shell polymer processes.

Mixtures and blends of soluble resins with insoluble emulsion polymers are known in the art and are generally used both alone and in various formulations as coatings and impregnates for cementitious applications. The soluble resin is generally prepared by solution polymerization, such as described in U.S. Pat. No. 3,037,942.

It is also known that core-shell emulsion polymers made significant improvements over prior art mixtures and blends such as described in U.S. Pat. No. 4,916,171. By polymerizing one component in the presence of the other to form a core-shell emulsion polymer, improvements in stability, rheology and water resistance were realized. It is still further known that the addition of an emulsion acrylic polymer as a powder dispersion in cementitious mixtures improves properties such as adhesion and strength of the cement matrix. For example, latex modified Portland cement is a premixed material wherein a polymer is added to the fresh concrete mixture in a liquid, powder or dispersed phase and cured. However, while the addition of core-shell emulsion polymers have improved some properties of premixed cement, other deficiencies still remain such as, for example, stability and redispersability of the acrylic emulsion.

What is required is a novel generation of core-shell polymer powders that are easily redispersible, stable, and that do not significantly retard mortar curing, while maintaining other properties such as shear bond adhesion, strength and trowelability.

DESCRIPTION OF THE PRIOR ART

U.S. Pat. No. 4,151,143, issued to Blank, et al., claims a surfactant-free emulsion polymer coating composition and method for preparing the same. Blank et al. discloses that the presence of surfactants is a significant problem with emulsion polymers employed as coatings. Surfactants are required to stabilize emulsion polymers; however, the presence of surfactants adversely affect the water and corrosion resistance of the resulting film as well as the adhesion of the coating to metal substrates.

Blank, et al. emulsion polymers are prepared in a two-stage process. The process includes (1) a first stage wherein a carboxyl group containing polymer is prepared by a conventional solution or bulk polymerization technique and then water-dispersed or solubilized by partial or full neutralization with an organic amine or base and high shear agitation, and (2) a second stage wherein a mixture of polymerizable monomers and polymerization catalyst is added to the first-stage emulsion at an elevated temperature to affect polymerization of the stage two monomers resulting in the formation of an emulsion coating composition. The coating composition is alleged to be surfactant-free.

Two-stage emulsion polymers are known to exist in many morphological forms which are determined by many factors including the relative hydrophilicity, miscibility and molecular weights of the first- and second-stage polymers. So-called "core-shell" polymers are formed when the second-stage polymers form a "shell" or coating around a discreet domain or "core" of the first-stage polymer. Examples of such core-shell polymers are disclosed in U.S. Pat. No. 4,916,171. Also, U.S. Pat. No. 4,876,313 discloses the use of polyfunctional compounds to chemically graft or bond the shell to the core in order to improve the resulting film's properties such as stability, water resistance and rheology after the addition of formulation additives, such as alcohol.

"Inverse core-shell" emulsion polymers, such as disclosed in U.S. Pat. No. 4,876,313, are also known. Inverse core-shell polymers are those where the second-stage polymer becomes the core and is surrounded by the shell which, in the inverse process, is the first-stage polymer. These inverse compositions can be formed when the first-stage polymer is more hydrophilic than the second-stage monomer (Lee and Ishikawa, The Formation of Inverted Core-Shell Latexes, *J. Poly. Sci.*, vol. 21, pages 147–154 (1983)).

While core-shell polymers have made significant improvements in such polymer properties such as chemical and water resistance, stability and rheology, additional improvements are required. Therefore, in order for the core-shell polymers to be especially useful in cementitious formulations: it must possess the desired morphology; it must be stable; it must be compatible with cement; it must possess bulk mortar curing capability without significantly retarding the curing process; and, it must demonstrate excellent toughness and adhesion, especially when applied in thin sections.

It is therefore an object of the present invention to produce novel core-shell emulsion polymers that are shelf-stable, compatible with cement, allows bulk mortar curing and have excellent toughness and adhesion.

It is a further object of the present invention to produce grafted core-shell polymers by a two-stage process employing polyfunctional compositions.

It is still a further object of the present invention to produce novel core-shell polymers that promote superior application properties such as adhesion and toughness when employed in cement formulations.

Still another object of the present invention is to produce core-shell polymers that are stable during spray drying.

Another object is to produce redispersible and storage stable core-shell polymer powders that perform in the application step. A final object of the present invention is to produce core-shell polymers with unique economic advantages during spray dry processing.

SUMMARY OF THE INVENTION

The present invention provides a process for the preparation of a stable, easily redispersable core-shell polymer powder prepared from spray drying a latex polymer. The latex polymer is produced by a two-stage sequential process: by forming an aqueous-insoluble polymer core with an alkali-soluble polymer shell, wherein the alkali-soluble shell polymer is polymerized from a mixture of monomers which have acid functionality, the shell polymer is then neutralized with a base or an amine and, in a subsequent polymerization step, a mixture of monomers is polymerized in the presence of the previously neutralized shell polymer to form an aqueous-insoluble core polymer. The core and the shell components are chemically grafted together by carrying out the emulsion polymerization of the core in the presence of at least one polyfunctional compound which is present in the shell monomers.

DETAILED DESCRIPTION

This invention relates to core-shell polymers produced by a two-stage aqueous emulsion sequential process and their subsequent use as a solid modifier for cementitious materials. By utilizing the process of this invention, a core-shell emulsion polymer product is produced where the core-shell polymers have an aqueous-insoluble polymer core and an alkali-soluble polymer shell, wherein the core and shell are chemically grafted together to a significant or substantial extent such that the core and shell are permanently attached. The compositions of the invention comprise grafted core-shell polymers such that, upon dissolving the shell with alkali, a significant portion of the shell remains permanently attached to the core. It is this permanent attachment of the shell and core through chemical grafting which is believed to provide stability to the core-shell polymer and physical properties to the cementitious mixtures that were previously unrealized using prior core-shell processes as well as processes involving polymer blends and polymer mixtures.

There are two techniques for preparing the grafted core-shell polymers. They are: Technique (1) emulsion polymerization of a mixture of monomers comprising a carboxylic acid or anhydride and an alkyl acrylate or alkyl methacrylate or styrene or substituted styrene, acrylamide or methacrylate or hydroxyalkyl ester of a carboxylic acid in the presence of a polyfunctional monomer to form a shell polymer, neutralizing the previously formed shell with an amine or base and, in a second stage, forming a mixture of monomers comprising an alkyl acrylate or methacrylate, styrene or substituted styrene and a hydroxyalkyl ester of a carboxylic acid or acrylamide or methacrylamide, methylolated acrylamide or methacrylamide, combining the second-stage monomers with the first stage and polymerizing the mixture to form the core-shell polymers of this invention; or Technique (2) of the method according to U.S. Pat. No. 4,916,171, emulsion polymerization of a mixture of monomers comprising an alkyl acrylate or methacrylate and a hydroxyalkyl ester of a carboxylic acid or acrylamide or methacrylamide in the presence of a polyfunctional monomer to form a core polymer and, in a second stage, forming a mixture of monomers comprising a carboxylic acid or anhydride and an alkyl acrylate or alkyl methacrylate, combining the second-stage monomers with the first stage and polymerizing the mixture to form the core-shell polymers.

Suitable monofunctional monomers for the preparation of the core and the shell polymers are selected from the group consisting of methyl acrylate, ethyl acrylate, butyl acrylate, 2-ethylhexyl acrylate, decyl acrylate, methyl methacrylate, ethyl methacrylate, hydroxyethyl methacrylate, hydroxypropyl acrylate, hydroxypropyl methacrylate, butyl methacrylate, acrylonitrile, acrylic acid, methacrylic acid, itaconic acid, maleic acid, fumaric acid, acrylic anhydride, methacrylic anhydride, methylolated acrylamide and methyl methacrylamide, methacrylamide, acrylamide, divinyl benzene, half esters of maleic anhydride/fumaric/itaconic, maleic anhydride, itaconic anhydride, styrene, substituted styrene, vinyl acetate and other $C_1$ to $C_2$ alkyl acrylates and methacrylates.

The weight ratio of the core polymer to the shell polymer is preferably about 95:05 to about 60:40, more preferably about 90:10 to about 70:30, and most preferably about 85:15 to about 75:25. Preferably, the core polymer has a weight average molecular weight greater than about 100,000, and the shell polymer has a weight average molecular weight of about 2,500 to about 12,000 as determined by aqueous gel permeation chromatography on the hydrolyzed sample. Preferably, the glass transition temperature (Tg) calculated by the "Fox Equation" of the core polymer is about −65° C. to about 35° C., and the Tg of the shell is greater than 60° C.

The polyfunctional compounds useful in chemically grafting the core and shell together are selected from (a) polyfunctional compounds having two or more sites of unsaturation, (b) reactive chain transfer agents having two or more abstractable atoms, and (c) hybrid polyfunctional compounds having one or more sites of unsaturation and one or more abstractable atoms. Compounds such as the glycidyl-containing vinyl monomers and vinyl isocyanates and the like, described in U.S. Pat. No. 4,565,839, are not suitable as polyfunctional compounds for this invention because they do not work to graft the core to the shell in aqueous-based emulsion polymerizations.

The polyfunctional compounds useful in the two-stage process of this invention are selected from the group consisting of allyl-, methallyl-, vinyl-, dicylopentenyl and crotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl-, methallyl-, crotyl-, and vinyl-amides of acrylic and methacrylic acids; N-allyl-, methallyl-, and crotyl-maleimide; vinyl esters of 3-butenoic and 4-pentenoic acids; diallyl phthalate; triallyl cyanurate; O-allyl-, methallyl-crotyl-, O-alkyl-, aryl-, P-vinyl-P-allyl-, P-crotyl-, and P-methallyl-phosphonates; triallyl-, trimethallyl-, and tricrotyl-phosphates; O-vinyl-, O,O-diallyl-, dimethallyl-, and dicrotyl-phosphates; alkenyl and cycloalkenyl esters of acrylic, methacrylic, maleic (mono- and di-esters), fumaric (mono- and di-esters), and itaconic (mono- and di-esters) acids; vinyl ethers and vinyl thioethers of cycloalkenols and cycloalkene thiols; vinyl esters of cycloalkene carboxylic acids; 1,3-butadiene, isoprene and other conjugated dienes; paramethylstyrene; chloromethylstyrene; allyl-, methallyl-, and crotyl-mercaptan; bromotrichloromethane; bromoform; carbon tetrachloride; and carbon tetrabromide.

Additionally, the polyfunctional compound can be selected from the group consisting of ethyleneglycol dimethacrylate, diethyleneglycol dimethacrylate, triethyleneglycol dimethacrylate, polyethyleneglycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetraacrylate, dipentaerythritol pentaacrylate, 1,3-butyleneglycol dimethacrylate, trimethylolpropane trimethacrylate, trimethylolpropane triacrylate, tripropyleneglycol diacrylate, divinyl benzene and the like.

Preferred polyfunctional compounds suitable for use in this invention may be selected from the group consisting of allyl-, methallyl-, dicyclopentenyl-, crotyl- and vinyl-esters of acrylic acid, methacrylic acid, maleic acid (mono- and di-esters), fumaric acid (mono- and di-esters) and itaconic acid (mono- and di-esters); N- or N,N di-, methallyl-, crotyl -and vinyl-amides of acrylic acid and methacrylic acid; N-methallyl and crotyl-maleimide; alkenyl or cycloalkenyl esters of acrylic acid, methacrylic acid, maleic acid (mono- and di-esters), fumaric acid (mono- and di-esters, fumaric acid (mono- and di-esters), itaconic acid (mono- and di-esters); 1,3-butadiene; isoprene; divinyl benzene; methallyl-, crotyl- and allyl-mercaptan.

Preferably, the polyfunctional compound(s) should be present in an amount less than about 5 percent by weight of the shell, more preferably about 0.5 to about 3.0 percent of the shell. The most preferred polyfunctional compound is allyl methacrylate.

Suitable monomers for use in preparing the shell monomer of this invention include those listed above for the preparation of the core. However, it is critical to the preparation of core-shell polymers of this invention that higher levels of acid-containing monomers are used in the shell than in the core in order to induce alkali solubility. The shell polymer, referred to hereinafter also as the "first stage", is formed from a mixture of monomers comprising from about 5 to about 40 percent by weight of a carboxylic acid or anhydride, and from about 30 to about 95 percent of an alkyl acrylate or alkyl methacrylate or styrene, and from about 0 to about 30 percent of a hydroxyalkyl ester of a carboxylic acid or acrylamide or methacrylamide. Preferred levels of acid-containing monomer(s) for the shell range from about 15 to about 35 percent by weight of the shell polymer. The most preferred acid-containing monomers for use in preparing the shell polymer is methacrylic acid. Anhydrides, such as methacrylic anhydride, maleic anhydride, itaconic anhydride and the like, may be used in place of the acid-containing monomers in the shell polymer. Preferably, the shell polymer comprises about 95 to about 60 percent by weight methyl methacrylate. The shell polymer preferably has a weight average molecular weight of about 2,500 to about 12,000 as determined by gel permeation chromatography. Common chain transfer agents or mixtures thereof known in the art, such as alkylmercaptans, are employed to control molecular weight, preferably $C_1$-$C_6$ alkyl and alkyloxy mercaptans and the like.

Based on equivalents of acid in the shell polymer, 0.8 to 1.5 equivalents of base are added to the shell, and more preferably about 0.95 to about 1.10 equivalents of base are added to the shell polymer compositions to neutralize and substantially, but not necessarily totally, dissolve the shell polymer so as to form a neutralized shell polymer and an aqueous solution of neutralized shell polymer. Polymerization of the core in the presence of the neutralized shell results in some of the shell polymer remaining permanently attached to the core. Bases that are suitable for use in this invention can be any kind of base, but is preferably selected from the group consisting of ammonia, triethylamine, monoethanolamine, dimethylaminoethanol, sodium hydroxide and calcium hydroxide and all other Group I A and II A hydroxides and the like.

The core-shell polymers of this invention are particularly useful as dry modifiers for cement mortars. The polymers are easily isolatable by conventional methods such as spray drying to yield dry, free-flowing powders which, upon admixture with cementitious compositions, provide superior physical properties and performance characteristics.

EXAMPLES

The examples which follow are intended to further illustrate the invention and should not be interpreted in any manner whatsoever to limit the scope of the present invention.

EXAMPLE 1

Two-Stage Sequential Core-Shell Polymer Process: Shell Levels

Example 1(a) - 10% Shell 800 g of DI water was charged to a 5 liter, 4-necked round bottom flask equipped with a mechanical stirrer, condenser and appropriate fittings to produce a nitrogen blanket over the reaction mixture. A monomer emulsion (ME 1) was then charged to the kettle followed by an initiator. A few minutes after the temperature leveled off, an $NH_3$ neutralizer was added which solubilized the polymer. The reactor contents were then heated to 85° C. via a heating mantle and a second monomer emulsion (ME #2) was then gradually added to the same kettle containing the solubilized polymer at a rate so that the reaction temperature stayed in the neighborhood of 80° C. to 85° C. The kettle contents were then cooled to 55° C. and additional initiator was added to reduce residual monomers to low levels.

| Material | ME #1 | ME #2 |
| --- | --- | --- |
| DI $H_2O$ | 49.4 | 536 |
| Pluronic L31 (L31) | — | — |
| 58% Alipal CO-436 | 6.8 | — |
| 28% Sodium Lauryl Sulfate (SLS) | — | — |
| 70% Triton X-165 | — | 50.6 |
| Butyl Acrylate (BA) | — | 885.7 |
| Methyl Methacrylate (MMA) | 154.4 | 859 |
| Methacrylic Acid (MAA) | 39.4 | 26.6 |
| Allyl Methacrylate (ALMA) | 3 | — |
| Methyl-3-Mercaptopropionate (MMP) | 6.9 | — |
| Rinse DI $H_2O$ | 55 | 90 |
| | 315 | 2448 |

ME #1 Initiator 4.5 g of 0.1% Solution of $FeSO_4.7H_2O$ (keep acid with $H_2SO_4$).

2.8 g of 70% t-Butyl Hydroperoxide (t-BHP) in 15 g of DI $H_2O$.

2.9 g of Sodium Sulfoxylate Formaldehyde (SSF) in 35 g of DI $H_2O$.

Neutralizer 28 g of $NH_3$ in 28 g of DI $H_2O$.

ME #2 Initiator
3.3 g of Ammonium Persulfate (APS) in 200 g DI H$_2$O for the kettle charge and 3.0 g of APS in 114 g DI H$_2$O for a cofeed.

Final Polymer Characterization
Percent Solids: 48.5
Particle Size (Brookhaven BI-90): 221 nm
pH: 6.8
Viscosity: 25 cps
Gel: Trace Example 1(b) - 20% Shell Use same procedure and recipe for example 1(a) except for: 1300 g of DI H$_2$O in the kettle and

| Material | ME #1 | ME #2 |
|---|---|---|
| Di H$_2$O | 100 | 395 |
| Pluronic L31 (L31) | 37.4 | 11.8 |
| 58% Alipal CO-436 | 1.4 | — |
| 28% Sodium Lauryl Sulfate (SLS) | — | 11.2 |
| 70% Triton X-165 | — | — |
| Butyl Acrylate (BA) | — | 787.3 |
| Methyl Methacrylate (MMA) | 309 | 763.6 |
| Methacrylic Acid (MAA) | 78.7 | 23.6 |
| Allyl Methacrylate (ALMA) | 5.9 | — |
| Methyl-3-Mercaptopropionate (MMP) | 13.8 | — |
| Rinse DI H$_2$O | 100 | 90 |
| | 646 | 2082.5 |

ME #1 Initiator
10 g of 0.1% Solution of FeSO$_4$.7H$_2$O (keep acid with H$_2$SO$_4$).
5.6 g of 70% t-Butyl Hydroperoxide (t-BHP) in 25 g of DI H$_2$O.
5.8 g of Sodium Sulfoxylate Formaldehyde (SSF) in 55 g of DI H$_2$O.
Neutralizer
55 g of NH$_3$ in 55 g of DI H$_2$O.
ME #2 Initiator
2.6 g of Ammonium Persulfate (APS) in 200 g DI H$_2$O for the kettle charge and 2.6 g of APS in 115 g DI H$_2$O for a cofeed.
Final Polymer Characterization
Percent Solids: 43.4
Particle Size (Brookhaven BI-90): 110 nm
pH: 7.0
Viscosity: 25 cps
Gel: 4.5 g Example 1(c) - 30% Shell 9.8 g of Borax in 1304 g of DI Water was charged to a 5 liter, 4-necked round bottom flask equipped with a mechanical stirrer, condenser and appropriate fittings to produce a nitrogen blanket over the reaction mixture. A monomer emulsion (ME #1) was then charged to the kettle followed by an initiator which produced a temperature exotherm. The reactor contents were then heated to 85° C. via a heating mantle and a second monomer emulsion (ME #2) was then gradually added to the same kettle containing the solubilized polymer at a rate so that the reaction temperature stayed in the neighborhood of 80° to 85° C. The kettle contents were then cooled to 55° C. and additional initiator was added to reduce residual monomers to low levels.

| Material | ME #1 | ME #2 |
|---|---|---|
| Di H$_2$O | 150 | 306 |
| 34% Aerosol A103 (A103) | 52.1 | |
| 28% Sodium Lauryl Sulfate (SLS) | — | 38.1 |
| Butyl Acrylate (BA) | — | 688.8 |
| Methyl Methacrylate (MMA) | 374.5 | 668.2 |
| Hydroxy Ethyl Methacrylate (HEMA) | 59 | |
| Methacrylic Acid (MAA) | 118.1 | 20.7 |
| Allyl Methacrylate (ALMA) | 8.9 | — |
| Methyl-3-Mercaptopropionate (MMP) | 20.7 | — |
| Rinse DI H$_2$O | 100 | 75 |
| | 913.2 | 1797 |

ME #1 Initiator
24 g of 0.1% Solution of FeSO$_4$.7H$_2$O (keep acid with H$_2$SO$_4$).
8.4 g of 70% t-Butyl Hydroperoxide (t-BHP) in 35 g of DI H$_2$O.
8.8 g of Sodium Sulfoxylate Formaldehyde (SSF) in 65 g of DI H$_2$O.
ME #2 Initiator
3.3 g of Ammonium Persulfate (APS) in 50 g DI H$_2$O for the kettle charge and 2.3 g of APS in 115 g DI H$_2$O for a cofeed.
Final Polymer Characterization
Percent Solids: 46.5
Particle Size (Brookhaven BI-90): 242 nm
pH: 5.7
Viscosity: 15 cps
Gel: trace Example 1(d) - 30% Shell Use same procedure and recipe for example 1(a) except for 1300 g of DI H2O in the kettle and

| Material | ME #1 | ME #2 |
|---|---|---|
| Di H$_2$O | 150 | 346 |
| Pluronic L31 (L31) | 38.9 | 10.3 |
| 58% Alipal CO-436 | 2.0 | — |
| 28% Sodium Lauryl Sulfate (SLS) | — | 9.8 |
| Butyl Acrylate (BA) | — | 688.8 |
| Methyl Methacrylate (MMA) | 442.7 | 668.2 |
| Methacrylic Acid (MAA) | 118.1 | 20.7 |
| Allyl Methacrylate (ALMA) | 8.7 | — |
| Methyl-3-Mercaptopropionate (MMP) | 20.7 | — |
| Rinse DI H$_2$O | 100 | 90 |
| | 881 | 1834 |

ME #1 Initiator
10 g of 0.1% Solution of FeSO$_4$.7H$_2$O (keep acid with H$_2$SO$_4$).
8.4 g of 70% t-Butyl Hydroperoxide (t-BHP) in 35 g of DI H$_2$O.
8.8 g of Sodium Sulfoxylate Formaldehyde (SSF) in 65 g of DI H$_2$O.
Neutralizer
82.1 g of NH$_3$ in 82.1 g of DI H$_2$O.
ME #2 Initiator
2.6 g of Ammonium Persulfate (APS) in 200 g DI H$_2$O for the kettle charge and 2.3 g of APS in 115 g DI H$_2$O for a cofeed.
Final Polymer Characterization
Percent Solids: 42.8
Particle Size (Brookhaven BI-90): 120 nm
pH: 7.3
Viscosity: 35 cps
Gel: 3.1 g

EXAMPLE 2

Two-Stage Sequential Core-Shell Polymer Process: Grafting

Example 2(a) -0% ALMA

Use same procedure and recipe for example 1(a) except for: 1000 g of DI H$_2$O in the kettle and

| Material | ME #1 | ME #2 |
|---|---|---|
| DI H$_2$O | 98.8 | 477 |
| Pluronic L31 (L31) | — | — |
| 58% Alipal CO-436 | 6.8 | — |
| 28% Sodium Lauryl Sulfate (SLS) | — | — |
| Triton X-165 | — | 45.0 |
| Butyl Acrylate (BA) | — | 787.3 |
| Methyl Methacrylate (MMA) | 314.9 | 763.6 |
| Methacrylic Acid (MAA) | 78.7 | 23.6 |
| Allyl Methacrylate (ALMA) | — | — |
| Methyl-3-Mercaptopropionate (MMP) | 13.8 | — |
| Rinse DI H$_2$O | 55 | 90 |
| | 568 | 2187 |

ME #1 Initiator
4.5 g of 0.1% Solution of FeSO$_4$.7H$_2$O (keep acid with H$_2$SO$_4$),
5.6 g of 70% t-Butyl Hydroperoxide (t-BHP) in 30 g of DI H$_2$O,
5.8 g of Sodium Sulfoxylate Formaldehyde (SSF) in 70 g of DI H$_2$O.
Neutralizer 56 g of NH$_3$ in 56 g of DI H$_2$O,
ME #2 Initiator
3.3 g of Ammonium Persulfate (APS) in 200 g DI H$_2$O for the kettle charge and 2.6 g of APS in 98.5 g DI H$_2$O for a cofeed.
Final Polymer Characterization
Percent Solids: 50.5
Particle Size (Brookhaven BI-90): 140 nm
pH: 7.1
Viscosity: 145 cps
Gel: 1 g

Example 2(b)- 1% ALMA 885 g of DI water was charged to a 5 liter, 4-necked round bottom flask equipped with a mechanical stirrer, condenser and appropriate fittings to produce a nitrogen blanket over the reaction mixture. The kettle contents were then heated to 75° C. A monomer emulsion (ME #1) was then charged to the kettle followed by an initiator. A few minutes after the temperature leveled off, a neutralizer was added which solubilized the polymer. Approximately 120 g of ME #2 was then added to the kettle followed by an APS initiator charge. The balance of the ME #2 was then gradually added to the same kettle containing the solubilized polymer at a rate so that the reaction temperature stayed in the neighborhood of 80° C. to 85° C. The kettle contents were then cooled to 55° C. and additional initiator was added to reduce residual monomers to low levels.

| Material | ME #1 | ME #2 |
|---|---|---|
| DI H$_2$O | 100 | 395 |
| Pluronic L31 (L31) | 37.4 | 11.8 |
| 58% Alipal CO-436 | 1.4 | — |
| 28% Sodium Lauryl Sulfate (SLS) | — | 11.2 |
| Butyl Acrylate (BA) | — | 799.4 |
| Methyl Methacrylate (MMA) | 311 | 775.2 |
| Methacrylic Acid (MAA) | 78.7 | — |
| Allyl Methacrylate (ALMA) | 3.9 | — |
| Methyl-3-Mercaptopropionate (MMP) | 13.8 | — |
| Rinse DI H$_2$O | 55 | 68 |
| | 601.2 | 2061 |

ME #1 Initiator
1.0 g of 1.0% Solution of FeSO$_4$.7H$_2$O (keep acid with H$_2$SO$_4$) in 4 g of DI H$_2$O.
5.8 g of 70% t-Butyl Hydroperoxide (t-BHP) in 20 g of DI H$_2$O.
3.6 g of Sodium Sulfoxylate Formaldehyde (SSF) in 40 g of DI H$_2$O.
Neutralizer
16.9 g of Ca(OH)$_2$ and 36.6 g of 50% NaOH in 123 g of DI H$_2$O.
ME #2 Initiator
6.3 g of Ammonium Persulfate (APS) in 50 g DI H$_2$O for the kettle charge and 3.1 g of APS in 115 g DI H$_2$O for a cofeed.
Final Polymer Characterization
Percent Solids: 51.0
Particle Size (Brookhaven BI-90): 135 nm
pH: 7.4
Viscosity: 142 cps
Gel: 2.3 g

Example 2(c)- 2% ALMA

Use same procedure and recipe for example 2(b) except for: 7.9 g of ALMA and 307 g of MMA in ME #1.
Final Polymer Characterization
Percent Solids: 50.2
Particle Size (Brookhaven BI-90): 228 nm
pH: 7.4
Viscosity: 640 cps
Gel: 22 g

Example 2(d) - 1.5% CMA

Use same procedure and recipe for example 2(a) except for: 5.9 g of Crotyl Methacrylate (CMA) and 309 g of MMA in ME #1 in place of the 314.9 g of MMA listed.
Final Polymer Characterization
Percent Solids: 48.2
Particle Size (Brookhaven BI-90): 145 nm
pH: 6.9
Viscosity: 75 cps
Gel: 2 g

EXAMPLE 3

Two-Stage Sequential Core-Shell Polymer Process: Neutralization

Example 3(a) - NH$_3$

Use same procedure and recipe for example 2(b) except for: 5.9 g of ALMA and 309 g of MMA in ME #1, 55 g of NH$_3$ in 123 g of DI H$_2$O in the Neutralizer, and add a 1.6 g APS in 25 g of DI H$_2$O Chaser after the ME #1 exotherm.
Final Polymer Characterization
Percent Solids: 49.7
Particle Size (Brookhaven BI-90): 129 nm
pH: 7.5
Viscosity: 160 cps
Gel: Trace

Example 3(b) - Ca/Na

Use same procedure and recipe for example 2(b) except for: 5.9 g of ALMA and 309 g of MMA in ME #1, 11.8 g of Ca(OH)₂ with 47.5 g of 50% NaOH in 118 g of DI H₂O for the Neutralizer, 1295 g in the kettle to start, and 0.6 g t-BHP/2 g DI H₂O coupled with 0.4 g SSF/4 g DI H₂O to use as a chaser after the ME #1 initiator charge.

Final Polymer Characterization
Percent Solids: 45.8
Particle Size (Brookhaven BI-90): 145 nm
pH: 7.5
Viscosity: 45 cps
Gel: 0.4 g

Example 3(c) - K/Ca

Use same procedure and recipe for example 2(b) except for: 5.9 g of ALMA and 309 g of MMA in ME #1, and 16.9 g of Ca(OH)₂ with 25.6 g of KOH (Potassium Hydroxide) in 170 g of DI H₂O for the Neutralizer, and 900 g of DI H₂O in the kettle to start.

Final Polymer Characterization
Percent Solids: 49.8
Particle Size (Brookhaven BI-90): 203 nm
pH: 7.2
Viscosity: 45 cps
Gel: 2.2 g

Example 3(d) - Na/Mg

Use same procedure and recipe for example 2(b) except for: 5.9 g of ALMA and 309 g of MMA in ME #1, and 13.3 g of Mg(OH)₂ (Magnesium Hydroxide) with 36.6 g of 50% NaOH in 108 g of DI H₂O for the Neutralizer, and 900 g of DI H₂O in the kettle to start.

Final Polymer Characterization
Percent Solids: 50.4
Particle Size (Brookhaven BI-90): 118 nm
pH: 7.2
Viscosity: 170 cps
Gel: 0.4 g

EXAMPLE 4

Two-Stage Sequential Polymerization Process (Other Compositions)

Example 4(a)

1295 g of DI water was charged to a 5 liter, 4-necked round bottom flask equipped with a mechanical stirrer, condenser and appropriate fittings to produce a nitrogen blanket over the reaction mixture. The kettle contents were then heated to 75° C. A monomer emulsion (ME #1) was then charged to the kettle followed by an initiator. A few minutes after the temperature levelled off, a chaser was added followed by a neutralizer which solubilized the polymer. Approximately 120 g of ME #2 was added to the kettle followed by an APS initiator charge. The balance of the ME #2 was then gradually added to the same kettle containing the solubilized polymer at a rate so that the reaction temperature stayed in the neighborhood of 80° to 85° C. The kettle contents were then cooled to 55° C. and additional initiator was added to reduce residual monomers to low levels.

| Material | ME #1 | ME #2 |
| --- | --- | --- |
| DI H₂O | 100 | 395 |
| Pluronic L31 (L31) | 37.4 | 11.8 |
| 58% Alipal CO-436 | 1.4 | — |
| 28% Sodium Lauryl Sulfate (SLS) | — | 11.2 |
| Butyl Acrylate (BA) | — | 799.4 |
| Methyl Methacrylate (MMA) | 311 | — |
| Styrene (STY) | — | 775.2 |
| Methacrylic Acid (MAA) | 78.7 | — |
| Allyl Methacrylate (ALMA) | 3.9 | — |
| Methyl-3-Mercaptopropionate (MMP) | 13.8 | — |
| Rinse DI H₂O | 55 | 68 |
| | 601.2 | 2061 |

ME #1 Initiator
1.0 g of 1.0% Solution of FeSO₄.7H₂O (keep acid with H₂SO₄) in 4 g of DI H₂O.
5.8 g of 70% t-Butyl Hydroperoxide (t-BHP) in 20 g of DI H₂O.
3.6 g of Sodium Sulfoxylate Formaldehyde (SSF) in 40 g of DI H₂O.

Neutralizer
16.9 g of Ca(OH)₂ and 36.6 g of 50% NaOH in 123 g of DI H₂O.

ME #2 Initiator
6.3 g of Ammonium Persulfate (APS) in 50 g DI H₂O for the kettle charge and 3.1 g of APS in 115 g DI H₂O for a cofeed.

Final Polymer Characterization
Percent Solids: 45.4
Particle Size (Brookhaven BI-90): 159 nm
pH: 7.4
Viscosity: 40 cps
Gel: 0.5 g

Example 4(b)

Use recipe and procedure as in 4(a) except substitute 992 g of MMA for all of the STY in ME #2, and use 583 g of BA.

Final Polymer Characterization
Percent Solids: 46.3
Particle Size (Brookhaven BI-90): 168 nm
pH: 7.1
Viscosity: 45 cps
Gel: 0.1 g

Example 4(c)

924 g of DI water was charged to a 5 liter, 4-necked round bottom flask equipped with a mechanical stirrer, condenser and appropriate fittings to produce a nitrogen blanket over the reaction mixture. The kettle contents were then heated to 75° C. A monomer emulsion (ME #1) was then charged to the kettle followed by an initiator. A few minutes after the temperature levelled off, a chaser was added followed by a neutralizer which solubilized the polymer. Approximately 103 g of ME #2 was added to the kettle followed by an APS initiator charge. The balance of the ME #2 was then gradually added to the same kettle containing the solubilized polymer at a rate so that the reaction temperature stayed in the neighborhood of 80° to 85° C. The kettle contents were then cooled to 55° C. and additional initiator was added to reduce residual monomers to low levels.

| Material | ME #1 | ME #2 |
| --- | --- | --- |
| DI H₂O | 84.6 | 335 |
| Pluronic L31 (L31) | 31.8 | 10 |
| 58% Alipal CO-436 | 1.2 | — |
| 28% Sodium Lauryl Sulfate (SLS) | — | 9.6 |

-continued

| Material | ME #1 | ME #2 |
|---|---|---|
| Butyl Acrylate (BA) | — | 669 |
| Methyl Methacrylate (MMA) | 258 | 649 |
| Methacrylic Acid (MAA) | 66.9 | — |
| Allyl Methacrylate (ALMA) | 5.02 | — |
| 50% Acrylamide Solution (AM) | 10 | 40.1 |
| Methyl-3-Mercaptopropionate (MMP) | 13.8 | — |
| Rinse DI $H_2O$ | — | 56 |
| | 457.1 | 1768 |

ME #1 Initiator 9.3 g of a 0.10% solution of $FeSO_4.7H_2O$ (keep acid with $H_2SO_4$).

4.8 g of 70% t-Butyl Hydroperoxide (t-BHP) in 19 g of DI $H_2O$.

3.1 g of Sodium Sulfoxylate Formaldehyde (SSF) in 35 g of DI $H_2O$.

Neutralizer 14.4 g of $Ca(OH)_2$ and 31.1 g of 50% NaOH in 104 g of DI $H_2O$.

ME #2 Initiator 5.35 g of Ammonium Persulfate (APS) in 114 g DI $H_2O$ for the kettle charge and 2.7 g of APS in 104 g DI $H_2O$ for a cofeed.

Final Polymer Characterization

Percent Solids: 45.1

Particle Size (Brookhaven BI-90): 154 nm pH: 7.4

Viscosity: 34 cps

Gel: 1.2 g

Example 4(d)

Use recipe and procedure as in 4(a) except substitute STY for MMA in the ME #1 and substitute MMA for STY in ME #2.

Final Polymer Characterization

Percent Solids: 45.1

Particle Size (Brookhaven BI-90): 199 nm pH: 8.5

Viscosity: 20 cps

Gel: 0.5 g

EXAMPLE 5

Blend Polymer Process (Comparative)

An alkali-soluble polymer similar to polymerizing ME #1 (shell) in example 3(b) was prepared and neutralized. Separately, the ME #2 polymer (core) in the same example was prepared. The two polymers were blended together at a ratio of 1 part of ME #1 polymer solids to 4 parts of ME #2 polymer solids. Yielding the same ratio of shell to core polymer prepared by the in-situ method.

The ME #2 polymer was prepared by the following method: 1347 g of DI $H_2O$ was charged to a 5 liter, 4-necked round bottom flask equipped with a mechanical stirrer, condenser, and appropriate fittings to produce a nitrogen blanket over the reaction mixture. The kettle contents were then heated to 85° C. A monomer emulsion preform (93 g) was then charged to the kettle followed by an initiator. A few minutes after the temperature levelled off, the balance of the monomer emulsion was then gradually added to the same kettle at a rate so that the reaction temperature stayed in the neighborhood of 80° C. to 85° C. The kettle contents were then cooled to 55° C. and additional initiator was added to reduce residual monomers to low levels.

| Material | |
|---|---|
| DI $H_2O$ | 556 |
| SLS | 24.2 |
| BA | 979.2 |
| MMA | 949.2 |
| MAA | 29.5 |
| Rinse DI $H_2O$ | 30 |
| | 2710.1 |

Initiator 6.8 g of APS in 30 g DI $H_2O$.

EXAMPLE 6

Two Stage Process Employing Blank Patent Process: Preparation of the shell (Comparative)

Into a 3 liter, 4-necked round bottom flask, equipped with a mechanical stirrer, condenser and $N_2$ gas inlet/outlet pods, charge 90 g of propylene glycol and 60 g of 2-ethoxy ethanol. The air in the kettle was displaced with $N_2$ and the kettle was heated to reflux, i.e., 130° to 135° C. Monomer components were mixed together and then 40 g of Dicumyl Peroxide was mixed in. The mix was then fed at a rate so that the entire mix would have been added in two hours. The kettle contents quickly built viscosity and then the reaction was terminated before all the monomer mix was added because it could no longer be stirred.

| Monomer Mix | |
|---|---|
| MMA | 1570 g |
| MAA | 400 |
| ALMA | 30 |
| MMP | 70 |

The shell (soluble polymer component) could not be made by the Blank Patent method.

EXAMPLE 7

Polymer Isolation as a Solid and Use in Portland Cement Modification

A slurry consisting of lime and DI $H_2O$ was mixed into the emulsions so that the final pH was between 8 and 9 and the feed solid content was between 35% and 40%. The neutralized emulsion was then spray-dried using a Bowen Model BLSA laboratory spray dryer. Inlet air temperature was adjusted to 125° C. and outlet air temperature was 55° C. to 60° C. as regulated by the feed rate. Concurrently, a solid anti-caking agent of the type disclosed in U.S. Pat. No. 3,985,704 was introduced to the top of the chamber at a rate to yield 5% in the final product. The resulting powders had a residual moisture level of about 2.0% and were free-flowing white powders with average particle size of 50 to 75 microns.

TEST PROCEDURES (1) Wet-out time—Eighty grams of each of the spray-dried powders prepared above were combined with a dry Portland cement mix consisting of 800 grams of Type I Portland cement, 2000 grams of 60 mesh sand and 8 grams of a solid defoamer (Colloids 775 DD). Using a Hobart mixer, approximately 370 grams of DI water was mixed into this dry mix until a very workable dough-like consistency was reached. The time required to reach this point was recorded as "wet-out time."

(2) Trowelability—This a subjective test that describes the consistency of the mortar.

(3) Thin section properties—1/16 to 1/32 inch thickness of mortar is placed on the concrete substrate and allowed to cure for 24 hours. Toughness and adhesion of the thin mortar section is tested by using a knife point and rated qualitatively.

(4) Shearbond adhesion—A 2"×2"×0.5" inch patch of mortar was cast on a concrete block and was cured at room temperature for seven (7) days. The shearbond adhesion strength was calculated by the shearing load required to separate the patch from the concrete divided by the area.

(5) Mortar Cure—A 2-inch cube mold was filled with mortar. After 24 hours at room temperature, the hardness is rated qualitatively by breaking the mortar cube and scratching the center with a knife.

Application results of the examples 1 through 5 provided in the above are summarized as follows:

TABLE 1

| Modified Mortar Properties of Powders from Example 1 | | | | |
|---|---|---|---|---|
| Powder | 1 | 2 | 3 | 4 |
| Example | 1a | 1b | 1c | 1d |
| Wet out time | 30 sec. | 30 sec. | 30 sec. | 30 sec. |
| Trowelability | excellent | excellent | excellent | excellent |
| Thin section toughness and adhesion | excellent | excellent | excellent | excellent |
| 2" Mortar cure (hardness after 24 hrs.) | rock hard | rock hard | rock hard | soft |
| Shearbond adhesion | 210 psi | 340 psi | 370 psi | 320 psi |

TABLE 2

| Modified Mortar Properties of Powders from Example 2 | | | | |
|---|---|---|---|---|
| Powder | 1 | 2 | 3 | 4 |
| Example | 2a | 2b | 2c | 2d |
| Wet out time | 90 sec. | 30 sec. | 26 sec. | 50 sec. |
| Trowelability | excellent | excellent | excellent | good |
| Thin section toughness and adhesion | good | excellent | excellent | good |
| 2" Mortar cure (hardness after 24 hrs.) | soft | rock hard | rock hard | rock hard |
| Shearbond adhesion | 150 psi | 285 psi | 390 psi | 200 psi |

TABLE 3

| Modified Mortar Properties of Powders from Example 3 | | | | |
|---|---|---|---|---|
| Powder | 1 | 2 | 3 | 4 |
| Example | 3a | 3b | 3c | 3d |
| Wet out time | 33 sec. | 15 sec. | 32 sec. | 69 sec. |
| Trowelability | excellent | excellent | excellent | good |
| Thin section toughness and adhesion | excellent | excellent | excellent | good |
| 2" Mortar cure (hardness after 24 hrs.) | rock hard | rock hard | rock hard | rock hard |
| Shearbond adhesion | 390 psi | 470 psi | 230 psi | 100 psi |

Powders obtained from Example 4(a), 4(b), 4(c) and 4(d) were tested according to the procedures described above. All of the powders were redispersable, and the mortars had excellent trowelability, thin section and bulk cure properties.

Powders made by the process of the present invention, Examples 1(a)–1(d), 2(b), 2(c), 3(a)–3(c) and 4(a)–4(d) were all particularly useful cement modifiers. This was further demonstrated by comparing powders from Example 1(b) (as a representative) and 5, an acrylic powder DP-1, made by a prior art process (see U.S. Pat. No. 4,916,171), a commercially available ethylene-vinyl acetate (EVA) powder and an unmodified mortar.

TABLE 4

| Modified Mortar Properties | | | | | |
|---|---|---|---|---|---|
| Powder | 1 | 2 | 3 | 4 | None |
| Identification | Example 1b | Example 5 | DP-1 | EVA | unmodified |
| Wet out time | 25 sec. | 64 sec. | 150 sec. | 15 sec. | — |
| Trowelability | excellent | good | excellent | good | poor |
| Thin section toughness and adhesion | excellent | good | excellent | fair | poor |
| 2" Mortar cure (hardness after 24 hrs.) | rock hard | soft | soft | rock hard | rock hard |
| Shearbond adhesion | 340 psi | 170 psi | 220 psi | 200 psi | 50 psi |

As illustrated in the above table, powders made from polymers produced by the two-stage sequential polymerization process of this invention showed comparable wet-out time when compared to the commercial product (EVA), 25 seconds versus 15 seconds, but was clearly superior to core-shell polymers, 150 seconds, made from prior art processes, as well as prior art polymer blends, 64 seconds.

Trowelability of the mortar modified with the polymer powder of the present invention was comparable to that of the prior art core-shell polymers but was superior to that of the prior art blends, the commercial product and the unmodified mortar.

Mortar thin section properties were comparable to those of prior art core-shell polymers but clearly superior to those of the prior art blends, the commercial product and the unmodified mortar.

Shearbond adhesion of 340 psi for the mortar modified with the polymer powders of the present invention showed significant improvements over that of the prior art core-shell polymers at 220 psi, polymer blends at 170 psi, the commercial polymer powder at 200 psi, and the unmodified mortar at 50 psi.

We claim:

1. A core-shell polymer powder produced by a two-stage aqueous emulsion sequential polymerization method comprising:
(a) forming in a first stage a mixture of monomers comprising from about 5 to about 40 percent of an ethylenically unsaturated carboxylic acid or anhydride, from about 30 to about 95 percent of an alkyl acrylate or alkyl methacrylate or styrene, from about 0 to about 30 percent of a hydroxyalkyl ester of a carboxylic acid or acrylamide or methacrylamide and from about 0.5 percent to about 3 percent of a polyfunctional compound based on the total weight of the shell, selected from the group consisting of allyl-, methallyl-, dicyclopentenyl-, crotyl- and vinyl-esters of acrylic acid, methacrylic acid, maleic acid (mono- and di-esters, fumaric acid (mono- and di-esters) and itaconic acid (mono- and di-esters); N- or N,N di-, methallyl-, crotyl- and vinyl-amides of acrylic acid and methacrylic acid; N-methallyl and crotyl-maleimide; alkenyl or cycloalkenyl esters of acrylic acid, methacrylic acid, maleic acid (mono- and di-esters), fumaric acid (mono- and di-esters, fumaric acid (mono- and di-esters), itaconic acid (mono- and di-esters); 1,3-butadiene; isoprene; divinyl benzene; methallyl-, crotyl- and allyl-mercaptan, (b) polymerizing the mixture to form a shell polymer, (c) neutralizing the shell with an amine or a base; and in a second stage, (d) forming a mixture of monomers comprising from about 70 to about 100 percent of an alkyl acrylate or methacrylate or styrene and from about 0 to about 30 percent of a hydroxyalkyl ester of a carboxylic acid or acrylamide or methacrylamide to produce a calculated Tg of $-65°$ to $+35°$ C.;

(e) combining the second-stage monomers mixture with the neutralized polymer of the first stage;

(f) polymerizing the combined monomers of the second stage to form the aqueous emulsion core-shell polymer;

(g) converting the aqueous emulsion core-shell polymer by spray-drying into a redispersible polymer powder; and, wherein the weight ratio of the core to the shell is from about 95:05 to about 60:40, the core having an average molecular weight of greater than about 100,000 and the shell having an average molecular weight of about 2,500 to about 12,000 for the hydrolyzed shell, as determined by gel permeation chromatography.

2. The core-shell polymer powder of claim 1 wherein the Tg of the shell is greater than about 60° C., and the Tg of the core is from about $-65°$ to about $+35°$ C.

3. The core-shell polymer powder of claim 1 wherein the mixture of monomers comprising the shell and the core are selected from the group consisting of methyl acrylate, ethyl acrylate, butyl acrylate, 2-ethylhexyl acrylate, decyl acrylate, methyl methacrylate, ethyl methacrylate, hydroxyethyl methacrylate, hydroxypropyl acrylate, hydroxypropyl methacrylate, butyl methacrylate, acrylonitrile, acrylic acid, methacrylic acid, itaconic acid, maleic acid, fumaric acid, acrylic anhydride, methacrylic anhydride, maleic anhydride, itaconic anhydride, styrene, substituted styrene, vinyl acetate and other $C_1$ to $C_{12}$ alkyl acrylates and methacrylates, acrylamide, methacrylamide, N-methylol methacrylamide, and N-methylol acrylamide.

4. The core-shell polymer powder of claim 3 wherein the mixture of monomers comprising the shell are about 5 to about 40 percent of a carboxylic acid or anhydride and from about 60 to about 95 percent of an alkyl acrylate or alkyl methacrylate or styrene, based on the total weight of the shell.

5. The core-shell polymer powder of claim 4 wherein the preferred mixture of monomers comprising the shell are methyl methacrylate, and methacrylic acid.

6. The core-shell polymer powder of claim 5 wherein the mixture of monomers comprising the shell have been neutralized with a base selected from the group consisting of ammonia, triethylamine, monoethanolamine, dimethylaminoethanol, and hydroxides of Group IA and Group IIA metals.

7. The core-shell polymer powder of claim 6 wherein the base is a blend of about 30–60% calcium hydroxide and about 40–70% sodium hydroxide, based on the total equivalents of acid neutralized.

8. The core-shell polymer powder of claim 6 wherein the base is 100 percent ammonia.

9. The core-shell polymer powder of claim 3 wherein the mixture of monomers comprising the core are about 0 to about 5 percent of an ethylenically unsaturated carboxylic acid or anhydride or acrylamide and from about 95 to about 100 percent of an alkyl acrylate or alkyl methacrylate or styrene, based on the total weight of the core.

10. The core-shell polymer powder of claim 9 wherein the mixture of monomers comprising the core are butyl acrylate and methyl methacrylate.

11. The core-shell polymer powder of claim 9 wherein the mixture of monomers comprising the core are butyl acrylate and styrene.

12. The core-shell polymer powder of claim 1 wherein the polyfunctional compound is selected from the group consisting of polyfunctional compounds having two or more sites of unsaturation, reactive chain transfer agents having two or more abstractable atoms and hybrid polyfunctional compounds having one or more sites of unsaturation and one or more abstractable atoms.

13. The core-shell polymer powder of claim 12 wherein the polyfunctional compound is allyl methacrylate.

14. A method of modifying cementitious compositions comprising admixing an effective amount of Portland cement with an effective amount of the core-shell polymer powder of claim 1.

* * * * *